Jan. 30, 1968     J. W. PESTA     3,366,201
WHEEL LOCK
Filed May 5, 1966
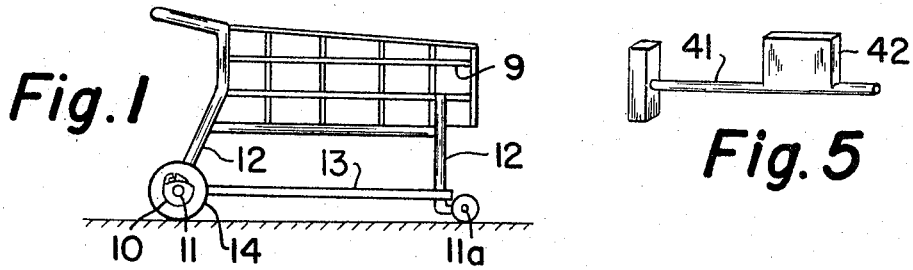
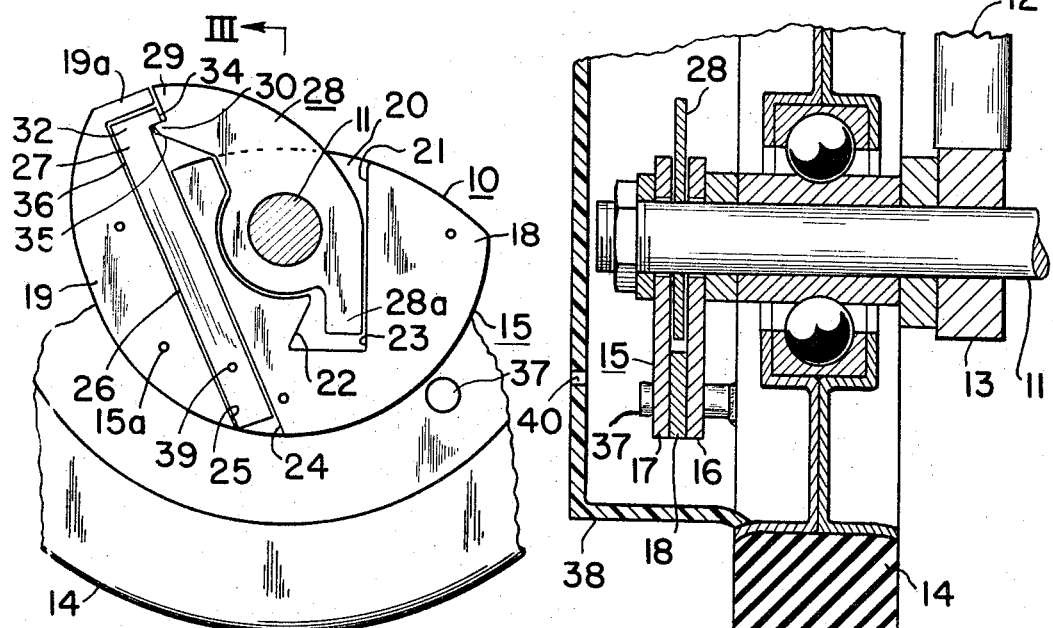
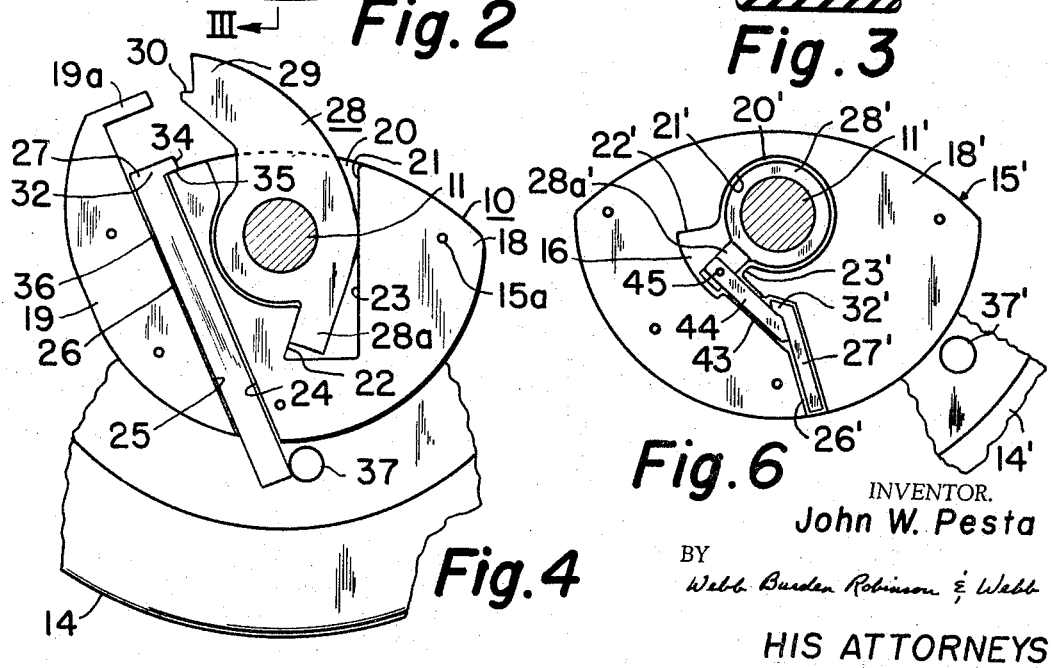
INVENTOR.
John W. Pesta
BY
Webb Burden Robinson & Webb
HIS ATTORNEYS

United States Patent Office 3,366,201
Patented Jan. 30, 1968

3,366,201
WHEEL LOCK
John W. Pesta, Montgomery Lane, Mingo Junction,
Ohio 43938
Filed May 5, 1966, Ser. No. 547,870
5 Claims. (Cl. 188—110)

This invention relates to a wheel lock and particularly to a mechanism for locking a wheel of a conventional four-wheel cart, such as a grocery or shopping cart, and the like, to discourage or prevent removal of the cart from the vicinity of a grocery store or supermarket.

At the outset, while I have hereinafter described my invention in its specific application to grocery or shopping carts, it is not my intention that the device be restricted to this use. Specifically, my wheel lock is suitable for use in connection with any structure including as an element thereof a rotatable wheel mounted on an axle which axle can be angularly rotated with respect to the wheel lock.

Most grocery stores and supermarkets provide four wheel basket shopping carts for the convenience of their customers in transporting grocery items selected from the various shelves of the store to a checkout counter. Often, as an added convenience, customers are permitted to use the carts to remove the purchased items from the store and transport them to cars in an adjacent parking area. Since many grocery stores and supermarkets are located in residential neighborhoods, there is a tendency for a customer who walks rather than drives to the store to expect to utilize the cart to carry his groceries to his nearby home.

The problem of recovering grocery carts which have been removed from the area of the store has, in recent years, become more complex for supermarket proprietors. While many of them hesitate to put strict sanctions on the use of grocery carts in the vicinity of the store area since this might be offensive to their customers and result in loss of trade, many proprietors have resorted to subtle ways of discouraging removal of the carts from their particular store area.

The prior art discloses numerous devices for preventing theft or removal of wheeled grocery carts from store areas, all of which can be grouped into three basic types. The first is that commonly called a "dead man" control which keeps the cart wheels locked until the customer wishes to move the cart.

The second type of wheel locking device includes a locking mechanism, mounted independently of the cart wheels, which is actuated when the cart moves over some obstacle, such as a curbing, to actuate a wheel brake on the cart.

The third type of locking device is actuated by either an electrical or magnetic contact strip in the pavement surrounding the supermarket area. When the cart moves over the contact strip, the device locks the cart wheels.

None of the foregoing devices satisfactorily overcomes the cart removal problem. To remove a cart which includes the "dead man" control from a store area, one need simply actuate the control and push the cart away from the area; in the second case, a simple reset of the independently suspended mechanism will allow the cart to be moved away from the parking area. The impracticality of installing and maintaining magnetic and electrical contact strips in parking areas together with the high initial cost of installing magnetic and electrically operated wheel locking devices on grocery carts makes the third type of device an unsatisfactory solution to the problem.

My novel answer to the problem of discouraging and preventing the removal of shopping carts from supermarket parking areas is a simple wheel locking device which is mounted to cooperate with a wheel and a fixed axle of a shopping cart. My wheel lock is preset so that travel by the cart over a curbing or obstacle of a predetermined height or greater causes the wheel lock to lock a wheel of a shopping cart.

Basically, I have invented a wheel lock comprising a projection mounted on the wheel to cooperate with a mechanism located on the fixed axle for releasably holding a stop bar and which releases the stop bar into the path of the projection when the cart is tilted to stop the wheel.

In the accompanying drawings, I have illustrated presently preferred embodiments of my invention wherein:

FIGURE 1 is an elevation view of a conventional four wheeled grocery cart showing the location of my wheel lock;

FIGURE 2 is an elevation view of one embodiment of my invention, with the outer cover removed;

FIGURE 3 is a section taken along the line III—III of FIGURE 2 including the outer cover and a hub cap positioned over the end of the axle;

FIGURE 4 is an elevation view similar to FIGURE 2 showing the device in position to lock the wheel;

FIGURE 5 is an elevation view of a key for use in resetting a wheel lock;

FIGURE 6 is an elevation view similar to FIGURE 2 of a second embodiment of my invention.

Referring to FIGURE 1, my wheel lock shown at 10, is secured to the end of a fixed axle 11 of a wheeled cart, such as a grocery or shopping cart. The cart includes vertically extending frame members 12 and horizontal frame members 13 which support a basket 9. Wheels 14 are rotatably mounted on parallel axles 11 and 11a (the front axles 11a usually being mounted in steerable casters) which are located at each end of the horizontal frame members 13.

Referring to FIGURES 2 and 3, my wheel lock includes a stop holder 15, the major portion of which is generally hemispherically shaped, and a part of the upper portion of which is substantially elliptical in shape. The stop holder is journaled on the end of the rear axle 11 of the grocery cart with the pivot point of the housing corresponding to the center of radius of the hemispherical portion of the stop holder. Thus, the stop holder is held substantially vertically below the axle by gravity.

It is through the use of a stop holder structure using the plump principle that I achieve the novel results of my invention. Since the stop holder will hang vertically despite any angular movement of the axle, any inclination of the horizontal frame member of the cart will result in an angular rotation of the fixed axle with respect to the stop holder, and actuate the wheel lock.

The stop holder 15 comprises an inner cover 16 and an outer cover 17 of the shape previously defined. The covers 16 and 17 are spaced slightly from each other and between them there are a channel plate 18 and a slot plate 19. The outer edges of the plates have the same peripheral shape as the outer edges of the covers.

The channel plate 18 includes along its top surface and adjacent the pivot point of the axle a channel 20, the walls of which are identified by the reference numeral 21. The lower portion of the channel 20 has a notched opening including shoulders or working surfaces 22 and 23. Although the working surfaces, as shown in FIGURE 2, are formed integrally with the channel plate, it is to be understood that they may be formed by separately adjustable elements mounted on the stop holder and positioned such that their surfaces form a part of the channel.

The edge 24 of the channel plate opposed to the slot plate 19 is substantially straight and extends downwardly from a point on the upper edge of the covers, and laterally spaced from the pivot point of the stop holder, to a point along the bottom edge of the stop holder substantially vertically aligned with the pivot point.

Spaced from the edge 24 and aligned therewith is an edge 25 of the slot plate 19. Both the slot plate and the channel plate are secured within the stop holder covers, such as by bolts 15a to provide a slot 26 which runs diagonally from the upper edge of the stop holder 15 downwardly toward the lower edge of the stop holder. An elongated metal stop bar 27 is adapted to slide longitudinally in slot 26 upon actuation of the device. A limit arm 19a provided on the slot plate 19 restricts upward movement of the bar 27 within the slot 26.

A latch lever 28 is secured to the fixed axle 11, as by a set screw or by welding, and turns with the axle within the walls 21 of the channel 20. A stop 28a at the lower end of the latch lever 28 below the center of the axle is movable within the channel 20, the angular displacement of the stop being limited by the working surfaces 22 and 23 of the channel.

The upper arm of the latch lever 28 includes a longitudinally extending arm 29, the outer end of which is adapted to engage the stop bar 27. Preferably, the arm 29 includes a thumb 30 which engages an outwardly extending head portion 32 of the stop bar 27 by fitting under and supporting the stop bar when the bar is in a raised position.

The head portion 32 of the stop bar 27 has a head 34 which extends perpendicularly to the length of the bar and in the direction of the latch lever a distance sufficient to provide a lateral shoulder 35 on the lower side of the head portion of the stop bar. The edge 36 of the head portion of the stop bar opposite the head 34 is substantially straight throughout both its length and the length of the bar 27.

Located on the outer face of the cart wheel 14 at a distance slightly greater from the axle than the radius of the hemispherical section of the stop holder 15 is an outwardly extending projection 37 which ordinarily moves, with each revolution of the wheel, around the periphery of the stop holder 15. As is apparent from the locked position of the bar 27 shown in FIGURE 4, however, when the stop bar is released from the latch lever, it falls directly across the circumferential path of the projection on the wheel, resulting in a positive wheel lock.

As shown in FIGURE 2, in normal operation of the device, as when the cart is being moved along the level aisles in a grocery store, the head portion of the bar is engaged with the thumb of the latch lever. The lateral shoulder 35 rests on the thumb 30 of the latch lever, with the edge 36 of the head portion of the stop bar closely adjacent the edge 25 of the slot plate adjacent the limit arm 19a.

The stop bar 27 is releasably engageable with the thumb 30 of the latch lever and, when released, moves in the slot 26 until the shoulder 35 of the stop bar abuts the upper edge of the channel plate. In the released position, as shown in FIGURE 4, the lower end of the stop bar extends a substantial distance below the lower edge of the stop holder. Of course, it is apparent that the head portion of the bar can be adapted for engagement with a socket provided on the latch lever without changing either the operation or effectiveness of my device.

Usually, all wheels of a conventional grocery cart rotate about axles in parallel horizontal planes. When the cart wheels are all of the same diameter, there is a single horizontal plane through all four, thus, the lower horizontal frame members 13 of the grocery cart to which the axles of the cart are secured and which support the cart are parallel to the level along which the cart is to be moved. Accordingly, the wheel lock depends below the axle in substantially perpendicular relation to the level of the cart movement and to the horizontal plane formed by the axles of the cart.

For free movement of the cart wheels about the axle, the stop bar 27 is retained within the slot with the head portion of the stop bar engaged with the thumb of the latch lever. To insure that the stop bar does not accidentally disengage or jar out of engagement with the latch lever, the latch lever may be secured to the axle in such a way that the stop is held normally against a working surface of the channel to hold the bottom of the stop holder at a slight angle with respect to vertical. Such an angular displacement or preload causes the head of the bar to be pressed more tightly against the end of the arm of the latch lever.

When the cart is pushed over an obstacle of predetermined height, as for example a curbing, the horizontal frame member 13 is inclined at an angle to ground level and the axle 11 is rotated in a direction to lift the latch lever 28 out of engagement with the head portion 32 of the stop bar 27, whereby the stop bar will drop downwardly in the slot 26 into an interference path with the projection 37 on the outer face of the cart wheel 14. Upon continued movement of the cart, the wheel rotates sufficiently to cause the projection 37 to abut the stop bar 27 and the stop holder 15 rotates only slightly until the stop 28a abuts one or the other working surface of the channel 20, depending on the direction of cart movement, to provide positive locking of the wheel.

My wheel lock can be included on any or all of the wheels of a grocery cart and may be mounted so as to lock either forward or reverse movement of the cart. I prefer to locate one wheel lock on each of the rear wheels of a cart with the latch lever arms being mounted in opposite directions. Such a mounting provides for positive locking of at least one wheel upon both upward and downward inclination of the front and rear of the cart with respect to each other.

Since the objective of my device is to discourage removal of the cart by locking the wheels, it is apparent that the device should be inaccessible or covered in order to prevent a customer from tampering with the stop bar after disengagement from the latch lever. This may be done simply, as shown in FIGURE 3, by covering the entire device with a light plastic hub cap 38, secured to the face of the wheel and extending over the axle 11. To reengage the device, the cart is placed in a horizontal position and the stop bar can be reset by using a strong magnet held against the outside of the hub and aligned with the stop bar. By lifting the magnet slightly, the stop bar will be raised and positioned for reengagement with the thumb of the arm of the latch lever thereby permitting the locked wheel to rotate freely about the fixed axle.

Alternatively, the plastic cap can be replaced with a metal hub cap having a keyhole 40 provided therein adjacent the slot 26. In this design, the stop bar 27 is provided with an outwardly extending pin 39, as shown in FIGURE 2. The pin protrudes through and is adapted to travel in a vertically extending slot cut in the outer cover plate of the stop holder. A key 41, shown in FIGURE 5, perpendicularly inserted in the keyhole and rotated will raise the pin. The key used includes an outer end having a flat 42 of size sufficient to abut the pin 39 when the key is turned. By rotating the key in the hole more than 180°, the pin is pushed upwardly until the stop bar reengages the latch lever. Only authorized store employees are provided with such a key, and therefore, customers are encouraged to abandon the locked carts rather than remove the carts from the store area. Other satisfactory means are available to reengage the stop bar, such as using a geared key to mesh with a rack provided on the face of the bar.

In FIGURE 6, I have shown a second embodiment of my invention which operates in substantially the same manner as heretofore desscribed with reference to FIGURES 1 through 5. Like reference numerals, followed by a prime ('), have been used in FIGURE 6 to refer to elements similar to those earlier described.

My second embodiment comprises a stop holder 15' including a channel plate 18' having the same peripheral shape as the covers (16 and 17 of FIGURE 3). A channel 20' having walls 21' is cut into the channel plate in the vicinity of the pivot point of the cart axle 11'. A latch lever 28' having an outwardly extending stop 28a' is fixed to the axle. The lower portion of the channel has a notched opening having working surfaces 22' and 23' against which the stop 28a' can abut upon actuation of the wheel lock. As pointed out in reference to my first embodiment, the working surfaces may be formed by separately adjustable elements mounted on the stop holder and positioned such that their surfaces form a part of the channel.

A slot 26' formed in the lower portion of the channel plate 18' extends longitudinally through the channel plate from a point adjacent the channel wall below the pivot point of the axle 11' to the lower edge of the stop holder 15'. A stop bar 27', including a head portion 32', slides in the slot 26'.

A guide slot 43 formed in the channel plate 18' communicates with the upper portion of the slot 26' and the notched opening in the channel 20'. A link 44, pivotally secured to the stop 28a' of the latch lever 28' by pin 45, is adapted to slide within the guide slot 43. The length of the link 44 from the stop 28a' is sufficient to engage the head portion 32' of the stop bar 27' and retain the stop bar in a raised position out of the path of a projection 37' on a wheel 14' for free rotation of the wheel.

In operation, when the latch lever 28' is rotated relative to the stop holder 15', as when the cart on which the wheel lock is mounted is tilted, the link 44 is withdrawn from its engagement with the head portion of the stop bar. Thus, the stop bar falls into an interference path with the projection on the wheel, and the wheel is locked against further rotation when the bar abuts the projection.

An advantage of my second embodiment is the provision of an integral channel plate to replace the channel and slot plates of my earlier described embodiment. Moreover, in the second embodiment, the outside dimension of the stop holder is reduced from that of the first embodiment by elimination of the outwardly extending arm of the latch lever and cooperating limit arm of the slot plate. Each of these advances improves the operation of the device and makes manufacture of my wheel lock easier and less expensive.

Since activation of my wheel lock, when used on a cart, depends upon the difference in the angle between the normal position of my device and the fixed cart frame as the cart is moved along a substantially level plane and the angle scribed when the cart is inclined with respect to a horizontal plane, it is apparent that the latch lever and stop bar can be designed to permit the cart to be inclined to any predetermined height or depth without actuating the device. Inasmuch as most curbing is usually between 4 and 8 inches in height, I have found that an angular displacement between level and inclined cart movement of about 12°—including 5° of rotation to provide pre-load or initial inclination of the device on the axle to prevent accidental locking of the wheel—will disengage the stop bar from the latch lever and cause the device to operate. Thus, a customer can push the cart equipped with my device up and down ramps, over faults in pavement surfaces, and over most obstacles normally encountered in the vicinity of a store without actuating the device.

From the foregoing, it is obvious that I have invented a novel wheel lock which provides a solution to the problem of discouraging the removal of grocery carts from supermarket parking areas. Moreover, I have disclosed a device which is inexpensive to manufacture, install and maintain. My wheel lock is adaptable for use with any wheeled cart without expensive or bulky accessory equipment and will not interfere with the ordinary and efficient conduct and convenience of the supermarket operation.

While I have described the presently preferred embodiments of my invention, it is to be understood that they may be otherwise embodied within the scope of the appended claims.

I claim:

1. A wheel lock for mounting on a fixed axle to cooperate with a rotatable wheel mounted thereon and useful for locking the wheel against free rotation about the axle upon angular rotation of the axle, said wheel lock comprising
   (A) a projection extending outwardly from the wheel parallel to said axle;
   (B) a stop holder journaled on said axle and extending radially outward therefrom a distance less than the distance from said axle to said projection whereby the projection passes around the stop holder as the wheel rotates, said stop holder including
      (1) a channel adjacent said axle; (a) said channel including working surfaces; and
      (2) a slot extending longitudinally through said stop holder transversely of said axle;
   (C) a latch lever fixedly secured to said axle and mounted for rotation between the working surfaces of said channel and having
      (1) an arm extending outwardly from said axle; and
      (2) a downwardly extending stop for engaging said working surfaces to limit rotational movement of said stop holder relative to said axle; and
   (D) a stop bar slidably mounted in the slot and having means for releasably engaging said arm whereby upon angular rotation of said axle with respect to said stop holder engagement of said stop with said working surfaces actuates said release means to disengage said stop bar from said latch lever and free it to drop downwardly into an interfering path with said projection to lock said wheel.

2. A wheel lock as described in claim 1 wherein the outwardly extending arm of the latch lever comprises a thumb and the release means of the stop bar includes a shoulder for releasable engagement with said thumb upon angular rotation of the axle with respect to the stop holder.

3. A wheel lock as described in claim 1 wherein the slot in the stop holder extends diagonally through the stop holder from a point adjacent an upper edge of the stop holder laterally spaced from the axle to a point along the lower edge of the stop holder in substantially vertical alignment with the axle.

4. A wheel lock as described in claim 1 including a cover secured to said wheel and over the end of said axle, said cover having a keyhole therein located adjacent said stop bar, and means for reengaging said stop bar and said latch lever, said reengaging means comprising
   (A) a pin affixed to said stop bar and extending outwardly from said bar substantially parallel to said axle; and
   (B) a key provided with a flat to engage and raise said pin when said key is inserted in said keyhole and rotated, whereby the stop bar is slidable upwardly within the slot to reengage the stop bar with the latch lever.

5. A wheel lock for mounting on a fixed axle to cooperate with a rotatable wheel mounted thereon and useful for locking the wheel against free rotation about the axle upon angular rotation on the axle, said wheel lock comprising
   (A) a projection extending outwardly from the wheel parallel to said axle;
   (B) a stop holder journaled on said axle and extending radially outwardly therefrom a distance less than the distance from said axle to said projection whereby the projection passes around the stop holder as the wheel rotates, said stop holder including (1) a channel adjacent said axle; (a) said channel including working surfaces;
(2) a first slot extending through said stop holder transversely of said axle; and
(3) a guide slot in communication with said channel and said first slot;

(C) a latch lever fixedly secured to said axle and mounted for rotation between the working surfaces of said axle and having
(1) an arm extending outwardly from said axle forming a stop for engaging said working surfaces to limit rotational movement of said stop holder relative to said axle; and
(2) a link pivotally secured to said arm and slidable in said guide slot; and (D) a stop bar slidably mounted in said first slot and having means for releasably engaging said link whereby upon angular rotation of said axle with respect to said stop holder engagement of said stop with said working surfaces actuates said release means to disengage said stop bar from said link and free it to drop downwardly into an interfering path with said projection to lock said wheel.

References Cited

UNITED STATES PATENTS

| | | | |
|---|---|---|---|
| 1,671,774 | 5/1923 | McIntosh | 16—35 |
| 3,090,470 | 5/1963 | Abrams | 188—110 |

MARVIN A. CHAMPION, *Primary Examiner.*

ROBERT L. WOLFE, *Assistant Examiner.*